(12) United States Patent
Salhany

(10) Patent No.: US 8,384,442 B2
(45) Date of Patent: Feb. 26, 2013

(54) INTEGRATED CIRCUIT SIGNAL GENERATION DEVICE

(76) Inventor: Wayne F. Salhany, Marietta, GA (US)

( * ) Notice: Subject to any disclaimer, the term of this patent is extended or adjusted under 35 U.S.C. 154(b) by 330 days.

(21) Appl. No.: 12/841,241

(22) Filed: Jul. 22, 2010

(65) Prior Publication Data

US 2012/0019286 A1 Jan. 26, 2012

(51) Int. Cl.
*H03K 5/01* (2006.01)
(52) U.S. Cl. .......... 327/100; 326/41
(58) Field of Classification Search .......... None
See application file for complete search history.

(56) References Cited

U.S. PATENT DOCUMENTS

| | | | |
|---|---|---|---|
| 4,228,495 A | 10/1980 | Bernhard et al. | |
| 4,727,303 A | 2/1988 | Morse et al. | |
| 4,792,737 A | 12/1988 | Goff et al. | |
| 4,864,204 A | 9/1989 | Dagget et al. | |
| 5,025,199 A | 6/1991 | Ako | |
| 5,081,593 A | 1/1992 | Pollack | |
| 5,404,289 A | 4/1995 | Hang et al. | |
| 5,412,299 A | 5/1995 | Gregory et al. | |
| 5,452,239 A * | 9/1995 | Dai et al. | 703/19 |
| 5,475,291 A | 12/1995 | Yoshida et al. | |
| 5,541,486 A | 7/1996 | Zoller et al. | |
| 5,986,427 A | 11/1999 | Tranquilla | |
| 6,151,567 A * | 11/2000 | Ames et al. | 703/13 |
| 6,274,995 B1 | 8/2001 | Kerner | |
| 6,321,366 B1 * | 11/2001 | Tseng et al. | 326/94 |
| 6,327,508 B1 | 12/2001 | Mergard | |
| 7,433,813 B1 * | 10/2008 | Ballagh et al. | 703/16 |
| 7,529,869 B2 | 5/2009 | Nemazie et al. | |
| 7,589,488 B2 | 9/2009 | Kitawaza et al. | |
| 7,652,445 B2 | 1/2010 | Xia et al. | |
| 7,724,844 B2 | 5/2010 | Erden et al. | |
| 7,738,977 B2 | 6/2010 | Weinhofer et al. | |

* cited by examiner

*Primary Examiner* — Crystal L Hammond

(57) ABSTRACT

An electronic integrated-circuit device is described in which mode control commands are stored. Mode parameters are also stored in the device. One or more inputs are used according to a predetermined process as determined by the stored parameters according to the stored commands and current mode. One or more output signals are produced. In various applications an output signal may be input to a sound amplifier, a lamp, a motor, a servo, etc. One application is a variety of sensor fusion. Procedural programming is avoided. The device operates with more speed and flexibility than other available configurations. Higher level supervisory management and control is useful for setup and initialization and is optional during operation. Selected platforms include microcontrollers; field programmable gate arrays (FPGAs) and application specific integrated circuits (ASICs).

17 Claims, 13 Drawing Sheets

INTEGRATED CIRCUIT SIGNAL GENERATION DEVICE

CROSS-REFERENCE TO RELATED APPLICATION

None

FEDERALLY SPONSORED RESEARCH

Not Applicable

SEQUENCE LISTING OR PROGRAM

Not Applicable

BACKGROUND FIELD

This application relates to electrical devices and circuits that have an output proportional to the value of a mathematical expression, specifically a polynomial mathematical expression.

BACKGROUND PRIOR ART

Programmable logic controllers (PLC) are typically programmed using ladder logic. Microcontrollers are programmed using machine language or C. Using these programming tools is time consuming and error prone.

Memory devices store data and logic devices perform specific logic. These have fixed and unalterable functionality. They are not programmable. Programmable logic devices (PLDs), including field programmable gate arrays (FPGAs) mix functionality with programmability. These devices is also time consuming and difficult to use.

In the attempt to reduce errors and increase productivity, blocks of logic have been created that can be interconnected using a development system. These blocks are compiled to produce integrated circuit devices with high levels of functionality and complexity. These devices typically comprise custom products and have the disadvantage of low volume runs and associated high relative cost.

Many memory and logic components are available as individual devices. These components include various types of memory devices, digital to analog signal converters, analog to digital signal converters, arithmetic logic devices, address encoders, address decoders, multiplexers, de-multiplexers, communications components and more. Using these integrated circuit devices is time consuming and space consuming if the desired functionality is complex Servo controllers are programmable single chip special purpose microcontrollers. Related devices are electronic cam followers and controllers for linear motors, high-speed actuators, non-linear dynamics, low mass actuators and piezoelectric actuators. These are tailored to specific applications and have functionality and performance tailored to the specific application.

High volume microprocessors, such as the Intel Pentium have great performance. These chips are complex. They are overly expensive and consume too much power for many applications.

SUMMARY PROBLEM DESCRIPTION

The following paragraphs present, in simplified form, a description of a problem of the type that is advantageously solvable using the disclosed device. This problem description is presented in order to provide a basic understanding of some aspects described herein. This description is not an extensive overview nor is intended to identify key/critical elements or to delineate the scope of the various aspects described herein. Its sole purpose is to present some concepts in a simplified form as a prelude to the more detailed description that is presented later.

An electrical signal can have many forms and be used for many purposes. It is desired to generate a first signal with a particular first form and then, based on a second signal or input, have the first signal take a particular second form. The situation in which the first signal has the first form can be designated as mode 1. The situation in which the first signal has the second form can be designated as mode 2.

It is further desired to have the first signal take a particular third form, based on a third signal or input, but only if the system is currently in mode 2. The situation in which the first signal has the third form can be designated as mode 3.

It is further desired to have the first signal take a particular fourth form, based on a fourth signal or input, but only if the system is currently in mode 3. The situation in which the first signal has the fourth form can be designated as mode 4.

It is further desired to have the form of the first signal be proportional to a polynomial expression with appropriate constant coefficients. Each mode is to have its own set of constant coefficients. The desired functionality is somewhat related to the concept of sensor fusion.

In addition the solution must fit a very small space, it must meet high performance requirements, it must be energy efficient and it must be inexpensive.

In one embodiment programming is minimized, errors are minimized, setup and initialization is simplified, design time is reduced, material costs are reduced, a single part number can be used in multiple ways in a single design, space is saved, function is easily modified, overall performance is improved and overall power consumption is reduced.

SUMMARY DESCRIPTION

The following paragraphs present, in simplified form, an exemplary embodiment. This summary is presented in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

From the problem scenario it can be seen some of the inputs to the device are analog in form and some are digital in form and have characteristics of data. The embodiment also has multiple modes or states. It is also to be observed that multiple input signals, that is signal sources, are connected to the device.

The exemplary embodiment provides the desired functionality in a single integrated circuit. Possible platforms include microprocessors, microcontrollers, gate arrays; field programmable gate arrays (FPGAs), application specific integrated circuits (ASICs), general purpose computers, calculators and optoelectronic computers.

The embodiment includes memory locations pre-allocated to hold the parameters for each mode. The embodiment also includes memory locations pre-allocated to hold the parameters that control the changing of the current mode. Other memory locations are included. Configuration of the device involves storing the values of various constants in these predetermined locations in memory.

The exemplary embodiment includes a communications interface. A computer or other client, for example a web browser, can communicate with the device. The attached client can read and set the values in the memory locations. The client can also read and set the mode. Additionally, the mode can be set by logic within the device itself. Another name for mode is state. The mode or state may change from mode to mode frequently or infrequently. It will be seen that communications delays can be minimized in this arrangement. Calculations are executed in the hardware to improve speed and flexibility of operation of the device.

It will be seen that several advantages of one or more aspects are to provide a configurable device that reduces the time needed to configure the device, reduces the risk of error and improves ease of use. In one or more aspects a higher level of flexibility, configurability, performance and adaptability offers the possibility of larger production runs, lower cost and smaller size for corresponding complexity, improved performance, increased usability and lower power consumption. These and other advantages of one or more aspects will become apparent from a consideration of the ensuing descriptions and accompanying drawings.

It is to be observed that the invention resides primarily in a modular arrangement of conventional electronic circuit components and the methods of use thereof.

BRIEF DESCRIPTION OF THE DRAWINGS

Elements of the arrangement are illustrated by way of example and not by way of limitation in the figures of the accompanying drawings, in which like references indicate similar elements and in which.

DETAILED DESCRIPTION OF A FIRST EMBODIMENT

Figure 1:
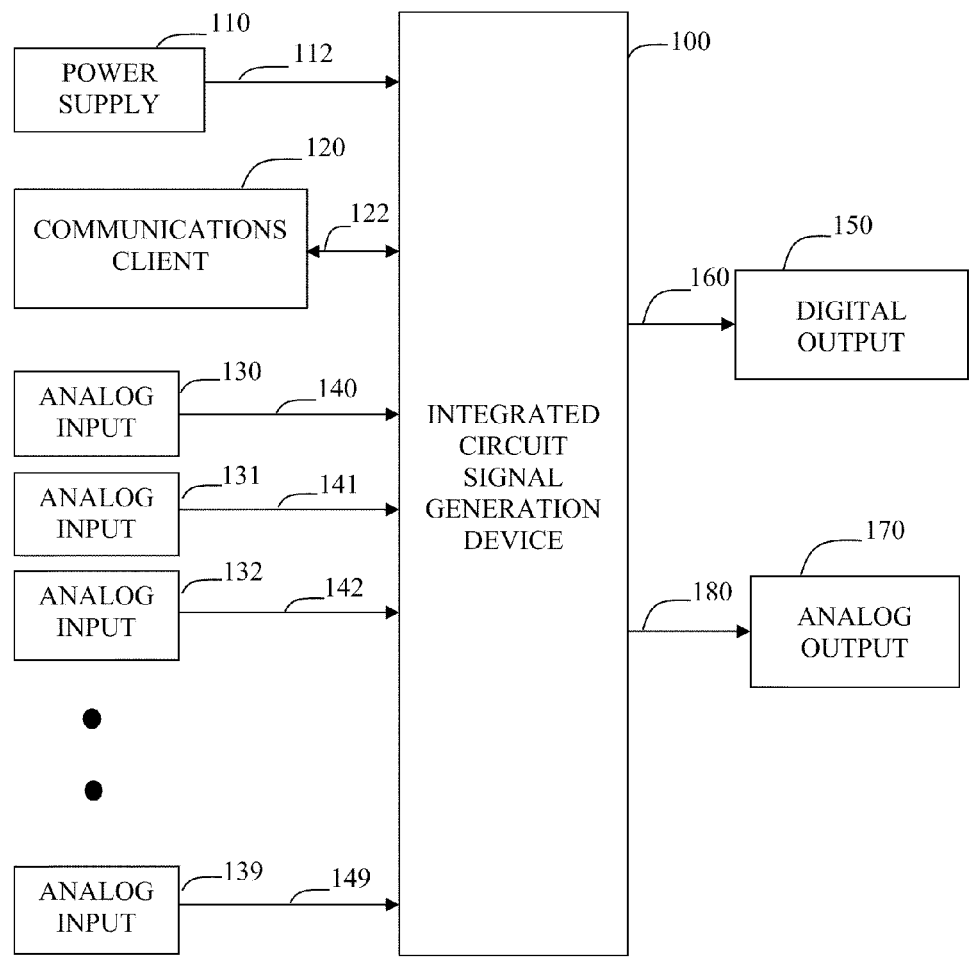
FIG. 1 is a block diagram that illustrates the major electrical connections to the device.

Consider FIG. 1. FIG. 1 shows the significant electrical connections to an integrated circuit signal generation device 100. In a first embodiment the device 100 is an application specific integrated circuit (ASIC). The device 100 is connected to power supply 110 via electrical connections 112. A communications client 120 is connected to the device 100 via electrical connections 122. Analog inputs 130, 131, 132 . . . 139 are connected to the device 100 via electrical connections 140, 141, 142 . . . 149. Digital output 150 is connected to the device 100 via electrical connections 160. Analog output 170 is connected to the device 100 via electrical connections 180.

Figure 2:
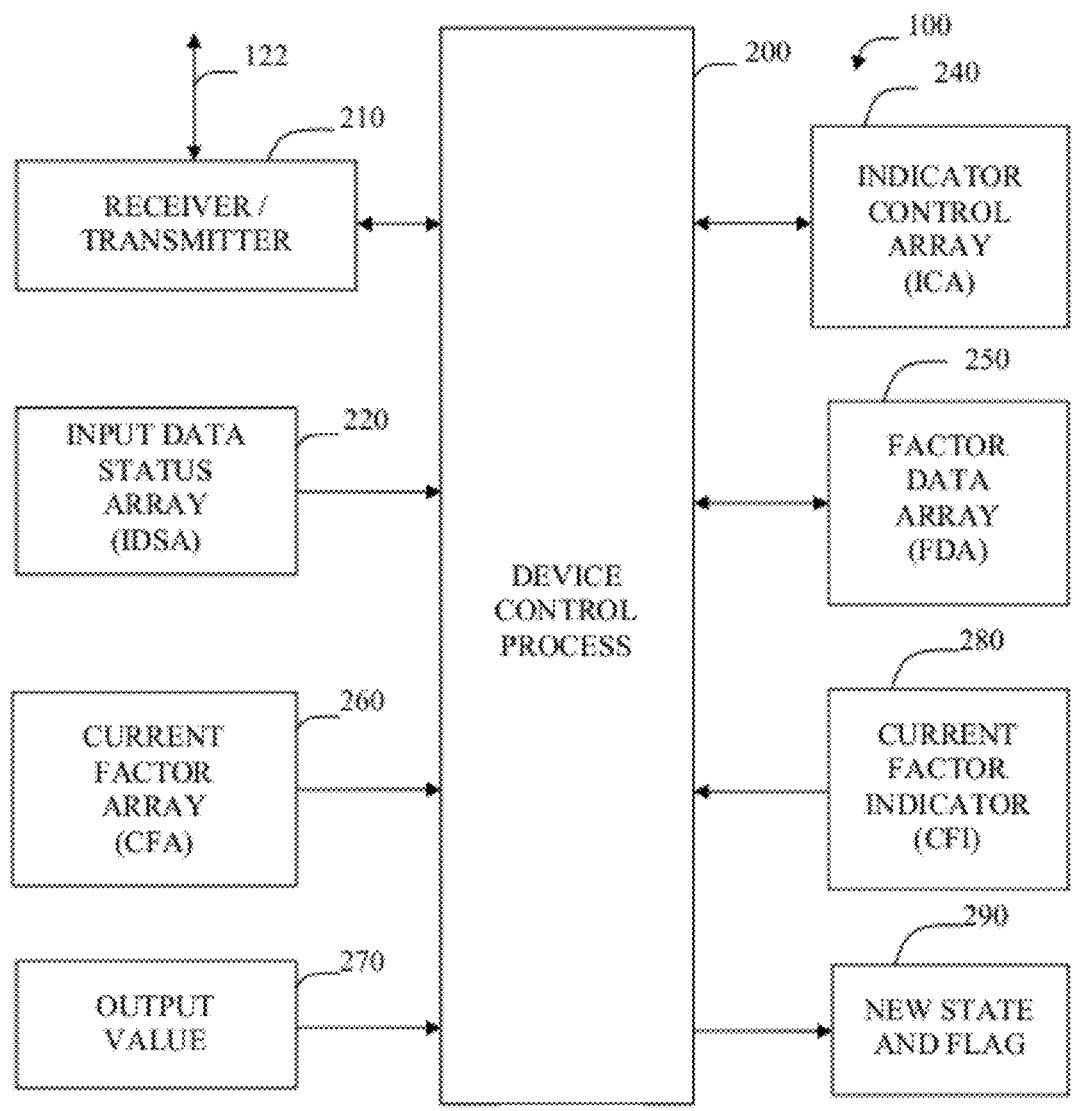
FIG. 2 is a block diagram that illustrates the major relationships between the device control process and other major components.

Consider FIG. 2. FIG. 2 shows connections to a device control process 200. The components shown in FIG. 2 are components of the device 100. A communications client 120 (FIG. 1) is connected via electrical connections 122 to a conventional receiver/transmitter 210. In this embodiment the communications client 120 (FIG. 1) is a web browser and the receiver/transmitter 210 includes a web server. The receiver/transmitter 210 is connected to the process 200. The process 200 is connected to a first memory, an array, the input data status array (IDSA) 220. The process 200 is connected to a second memory, an array, the indicator control array (ICA) 240. The process 200 is connected to a third memory, an array, the factor data array (FDA) 250. The process 200 is connected to a fourth memory, an array, the current factor array (CFA) 260. The process 200 is connected to a fifth memory, a number, the output value 270. The process 200 is connected to a sixth memory, a number, the current factor indicator (CFI) 280. The process 200 is connected to a seventh memory, a number, the new state and an eighth memory, a boolean, the flag, the new state and flag 290.

The receiver/transmitter 210 could be implemented in any number of conventional ways. Some candidate examples are a parallel bus, a serial bus, the internet, the internet protocol, Ethernet (IEEE 802), Universal Serial Bus (USB), serial teletype communications protocol (RS232, RS422, RS485, etc), Serial Peripheral Interface (SPI), Inter-Integrated Circuit Bus (I2C) or some other publically documented or proprietary communication protocol or standard.

Figure 3:
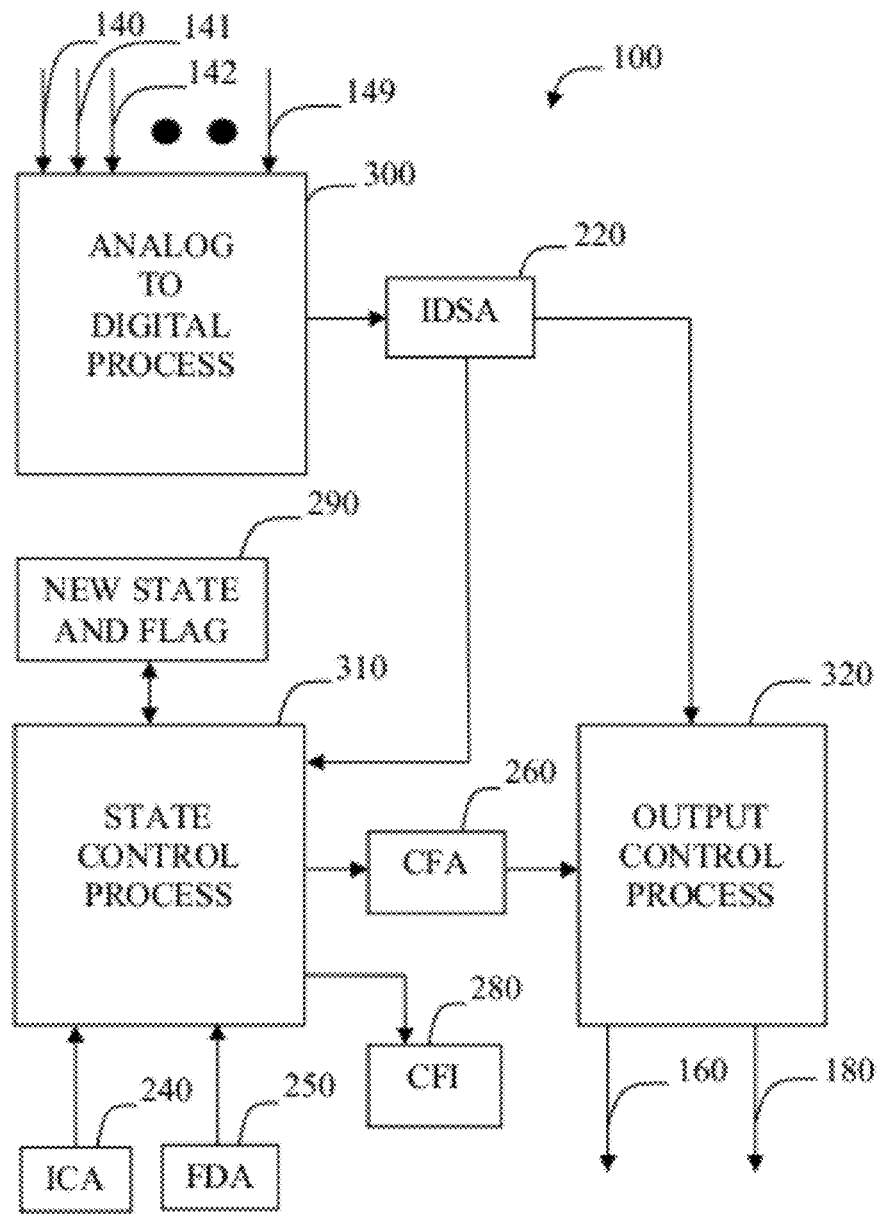
FIG. 3 is a block diagram that illustrates the major relationships between the analog to digital process, the state control process, the output control process and other major components.

Consider FIG. 3. FIG. 3 shows connections to an analog to digital process 300, a state control process 310, and an output control process 320. The components shown in FIG. 3 are components of the device 100. Electrical connections 140, 141, 142 . . . 149 connect the inputs 130, 131, 132 . . . 139 (FIG. 1) to the analog to digital process 300. Process 300 is connected to the first memory array 220. Array 220 is connected to the state control process 310 and the output control process 320. The state control process 310 is connected to the second memory array 240, the third memory array 250, the fourth memory array 260, the sixth memory 280 and the seventh and eighth memories, 290. Array 260 is connected to the output control process 320. Process 320 is connected to output electrical connections 160/180.

Figure 4:
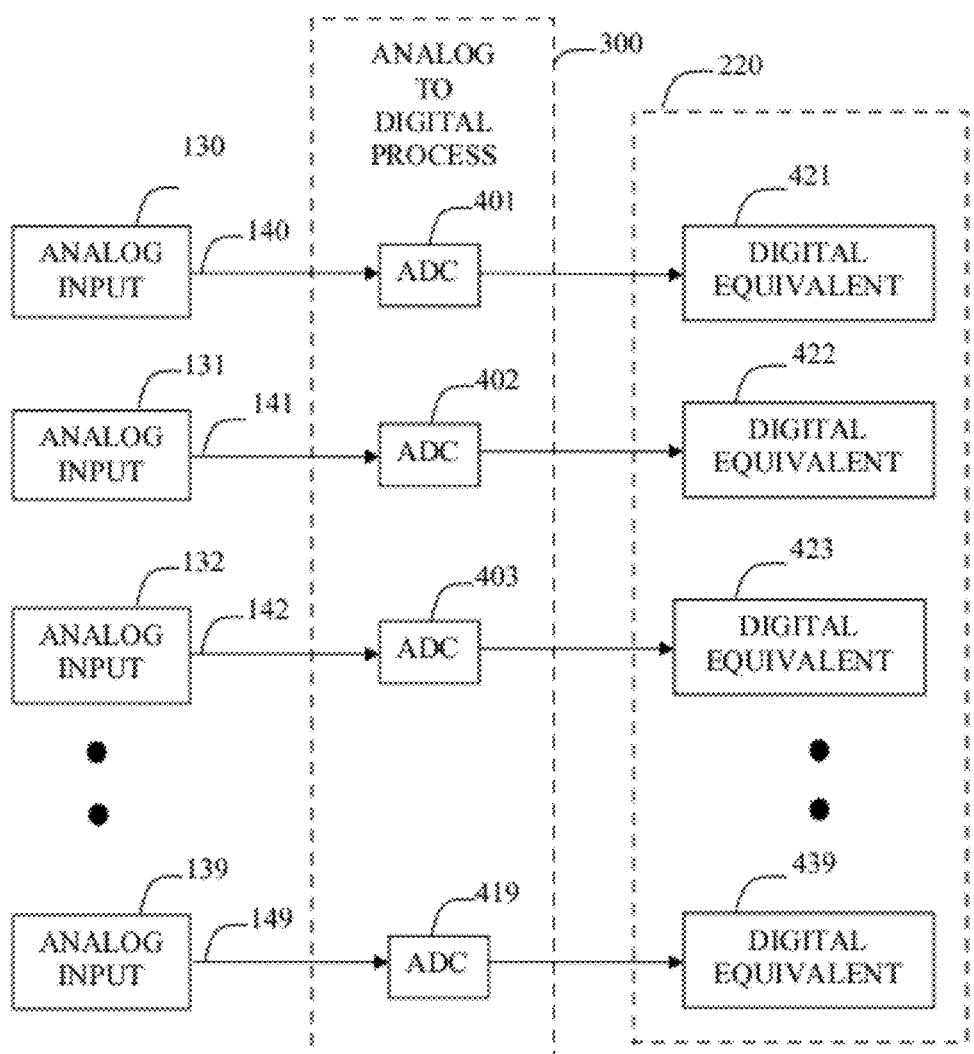
FIG. 4 is a block diagram that illustrates the major relationships between the inputs, the analog to digital circuits and the input data status array (IDSA) in one embodiment.

Consider FIG. 4. FIG. 4 shows the one-to-one relationship between the inputs 130, 131, 132 . . . 139 (FIG. 1) and the respective digital equivalents 421, 422, 423 . . . 439. The digital equivalents 421, 422, 423 . . . 439 are elements of the array 220. There may be any predetermined number of electrical inputs. There are as many elements in the array 220 as there are inputs. Inputs 130, 131, 132 . . . 139 are connected to the analog to digital process 300 via electrical connections 140, 141, 142 . . . 149. Each set of electrical connections is connected to its respective input circuit ADC 401, 402, 403 . . . 419. The outputs of the input circuits are connected to the respective digital equivalents 421, 422, 423 . . . 439. In this embodiment the analog to digital process 300 is implemented in hardware. In this embodiment all inputs are analog but inputs may be digital in other embodiments.

Figure 5:
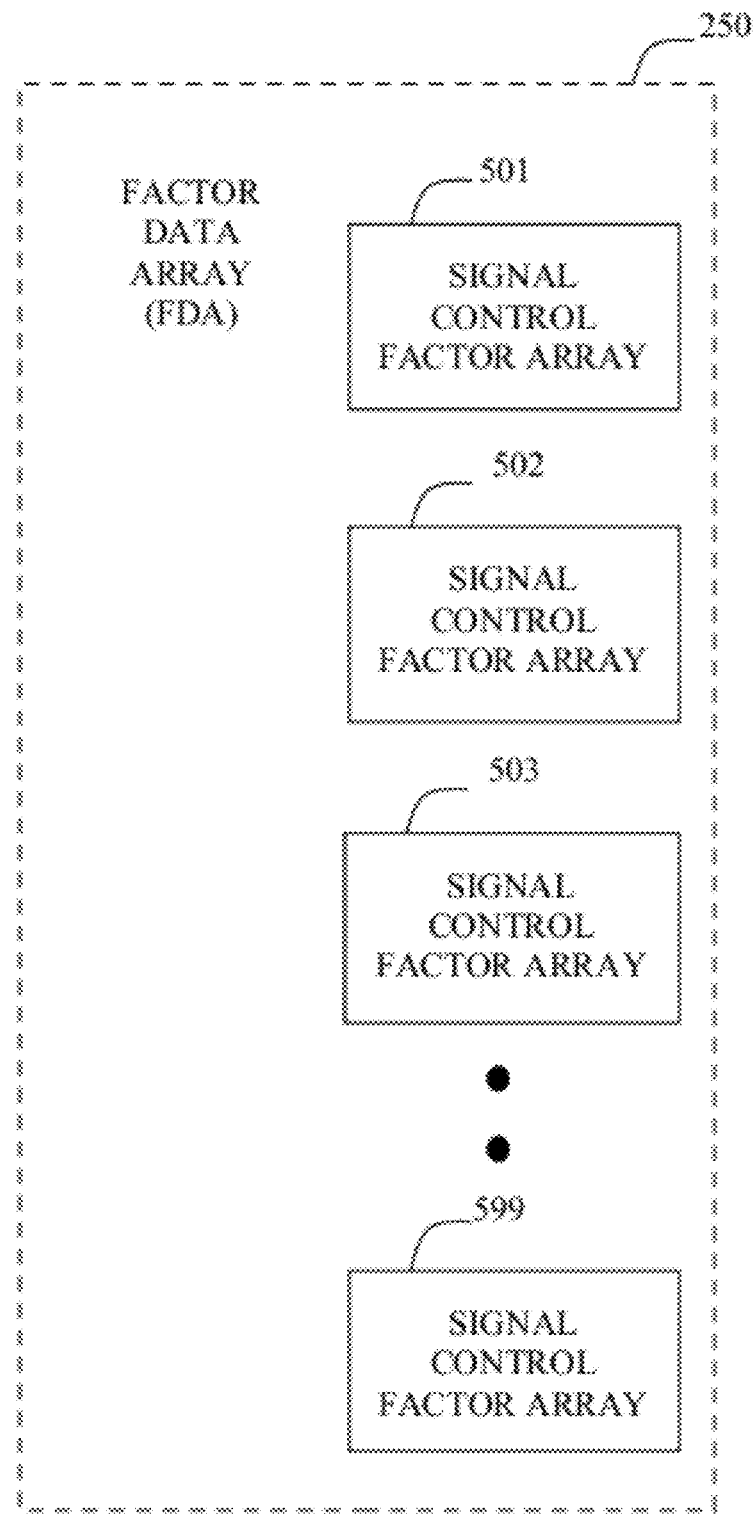
FIG. 5 is a block diagram that illustrates the content of the factor data array (FDA).

Consider FIG. 5. FIG. 5 illustrates the content of the factor data array (FDA) 250. There may be any predetermined number of elements in the array 250. Each element of the array 250 contains a signal control factor array. The figure illustrates the first three elements 501/502/503 and the last element 599 of the array 250. Each signal control factor array is itself an array.

Figure 6:
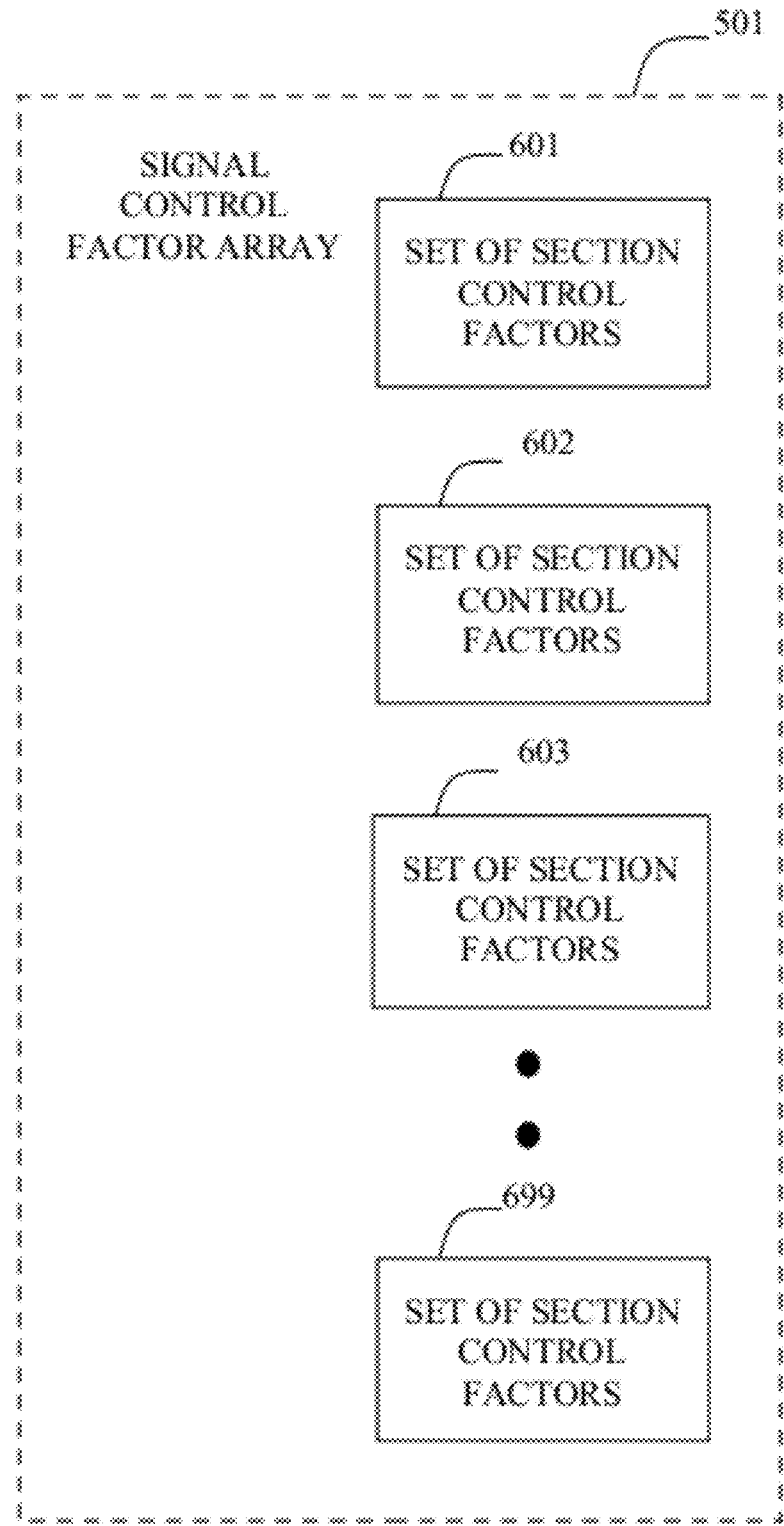
FIG. 6 is a block diagram that illustrates the content of a signal control factor array.
Figure 7:
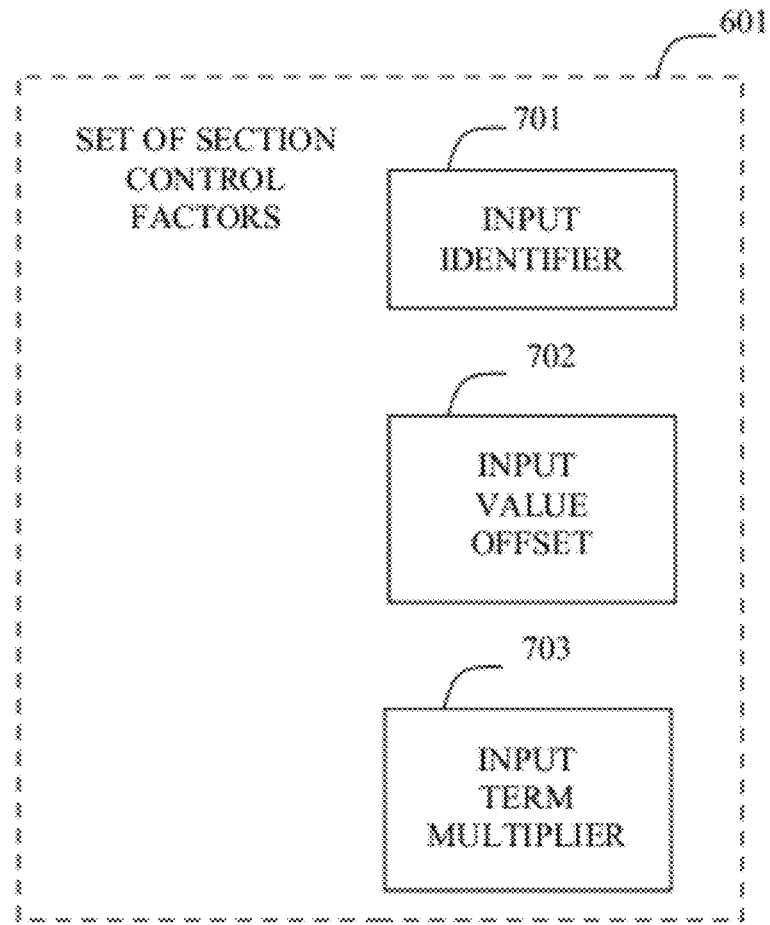
FIG. 7 is a block diagram that illustrates the content of a set of section control factors.

Consider FIG. 6. FIG. 6 illustrates the content of a signal control factor array. A signal control factor array 501 is shown as exemplary. This array 501 is the first element of the factor data array (FDA) 250. The number of elements in the array 501 is the same as the number of sections in the output control process 320. The figure illustrates the first three elements 601/602/603 and the last element 699 of the array 501. Each element of array 501 contains a set of section control factors. Each set of section control factors contains or holds three numbers in memory in this embodiment Consider FIG. 7. FIG. 7 illustrates the content of a set of section control factors. A set of section control factors 601 is shown as exemplary. This set of factors 601 is the first element in the signal control factor array 501. The set of factors 601 contains or holds three numbers in memory in this embodiment. The first number is an input identifier 701. The second number is an input value offset 702. The third number is an input term multiplier 703.

Figure 8:
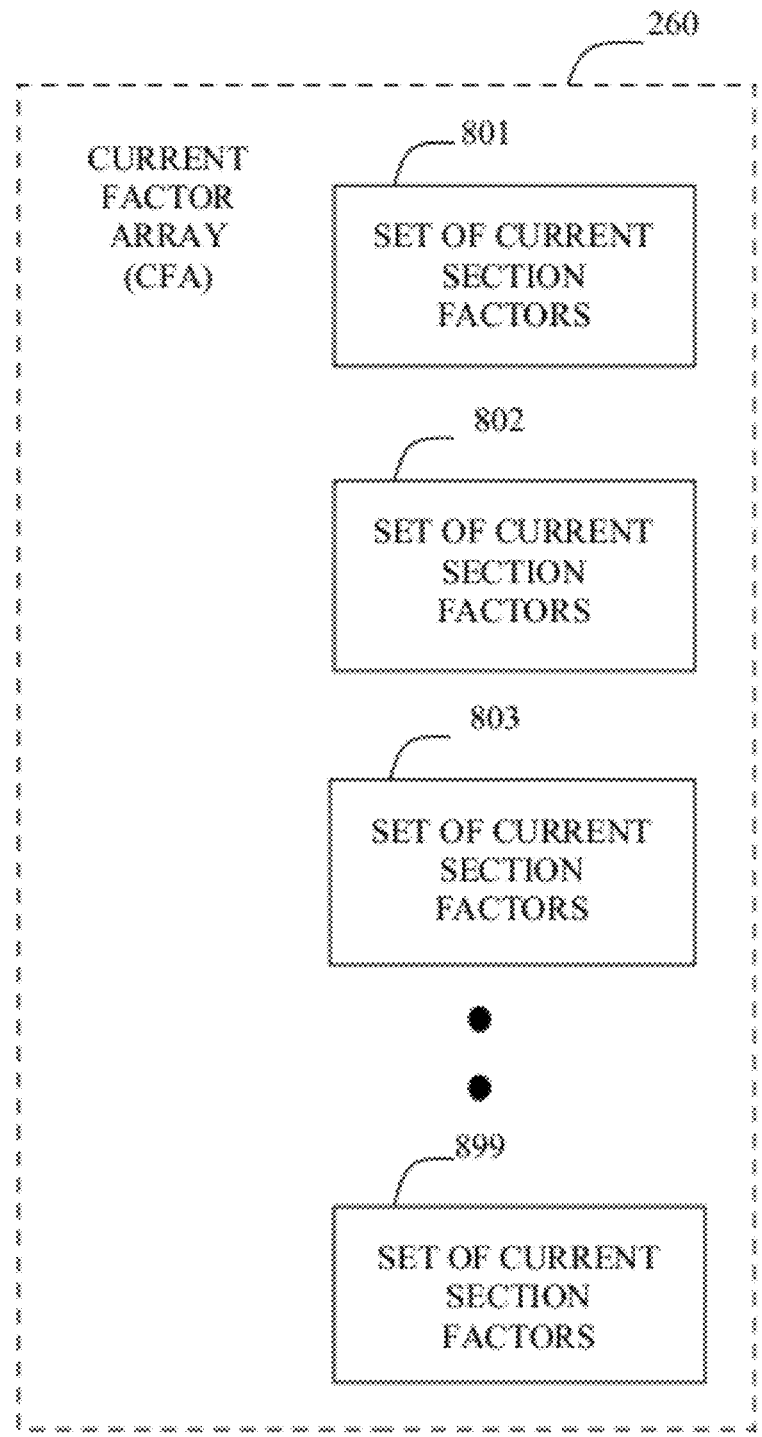
FIG. 8 is a block diagram that illustrates the content of the current factor array (CFA).

Consider FIG. 8. FIG. 8 illustrates the content of the current factor array (CFA) 260. The number of elements in the array 260 is the same as the number of sections in the output control process 320. The figure illustrates the first three elements 801/802/803 and the last element 899 of the array 260. Each element of array 260 contains a set of current section factors. Each set of current section factors contains or holds three numbers in memory in this embodiment. The array 260 is connected to one of the signal control factor arrays, for example the first element of the factor data array 250, by the copy logic described later.

Figure 9:
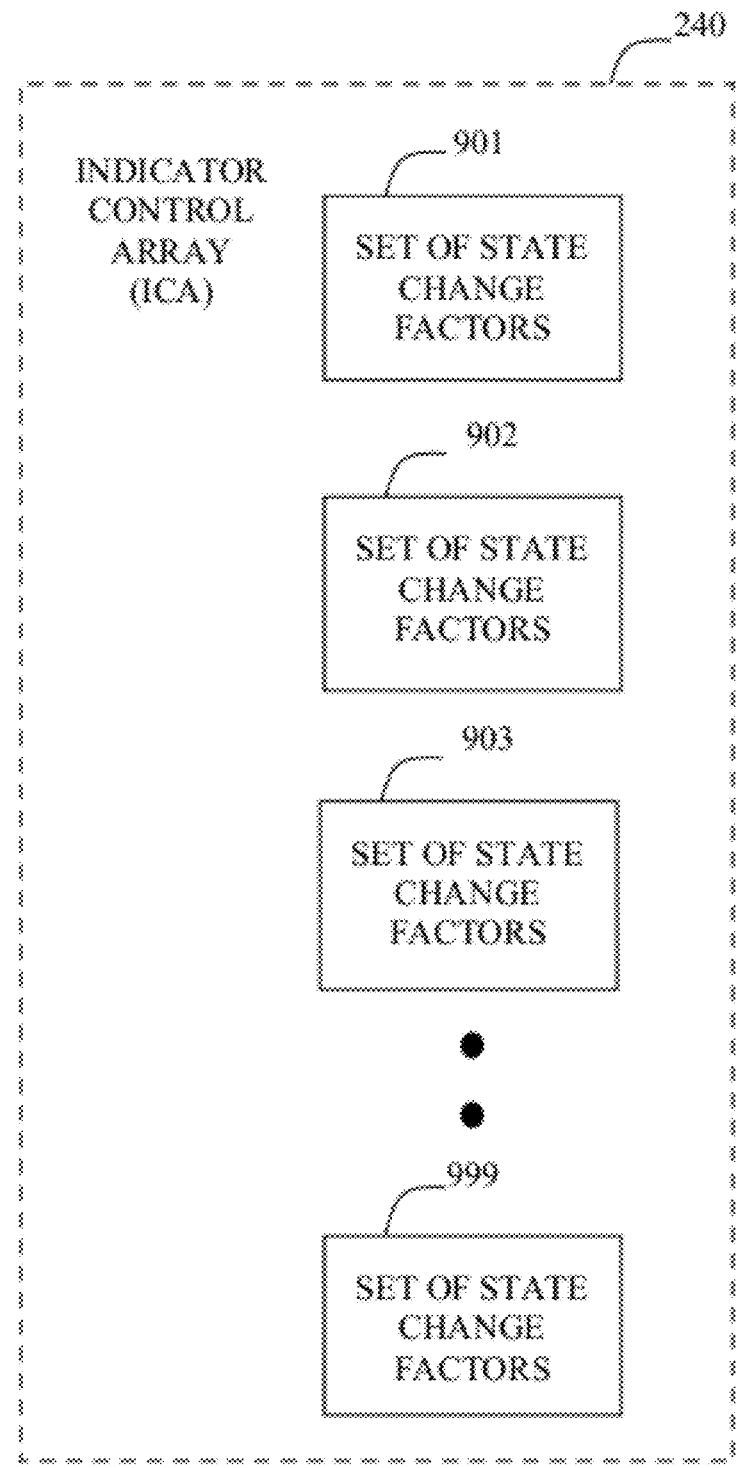
FIG. 9 is a block diagram that illustrates the content of the indicator control array (ICA).
Figure 10:
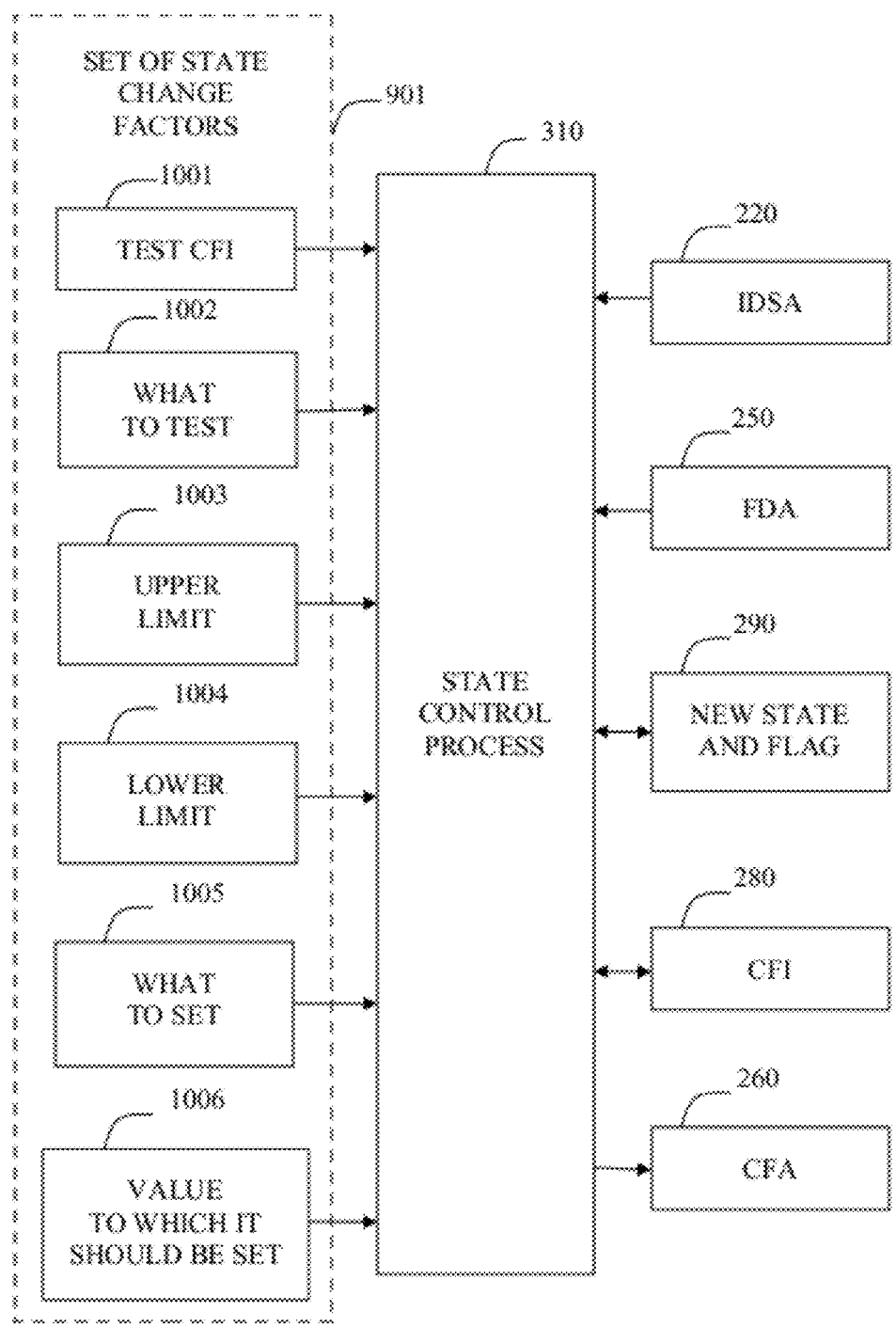
FIG. 10 is a block diagram that illustrates the content of a set of state change factors and the context in which they are used.

Consider FIG. 9. FIG. 9 illustrates the content of the indicator control array (ICA) 240. There may be any predetermined number of elements in the array 240. Each element of the array 240 contains a set of state change factors. The figure illustrates the first three elements 901/902/903 and the last element 999 of the array 240. Each set of state change factors contains or holds six numbers in memory in this embodiment Consider FIG. 10. FIG. 10 illustrates the content of a set of state change factors and the context in which they are used. A set of state change factors 901 is shown as exemplary. This set of factors 901 is the first element of the indicator control array (ICA) 240. The set of factors 901 contains or holds six numbers in memory in this embodiment. The first number is a test current factor indicator (CFI) 1001. The second number is a what to test 1002. The third number is an upper limit 1003. The fourth number is a lower limit 1004. The fifth number is a what to set 1005. The sixth number is a value to which it should be set 1006. These six numbers are used by the state control process 310. The first memory IDSA 220 and the third memory FDA 250 are used by the process 310. Process 310 reads and sets the values of the new state and flag 290. Process 310 reads and sets the value of the current factor indicator (CFI) 280. Process 310 sets the values in the current factor array (CFA) 260.

Figure 11:
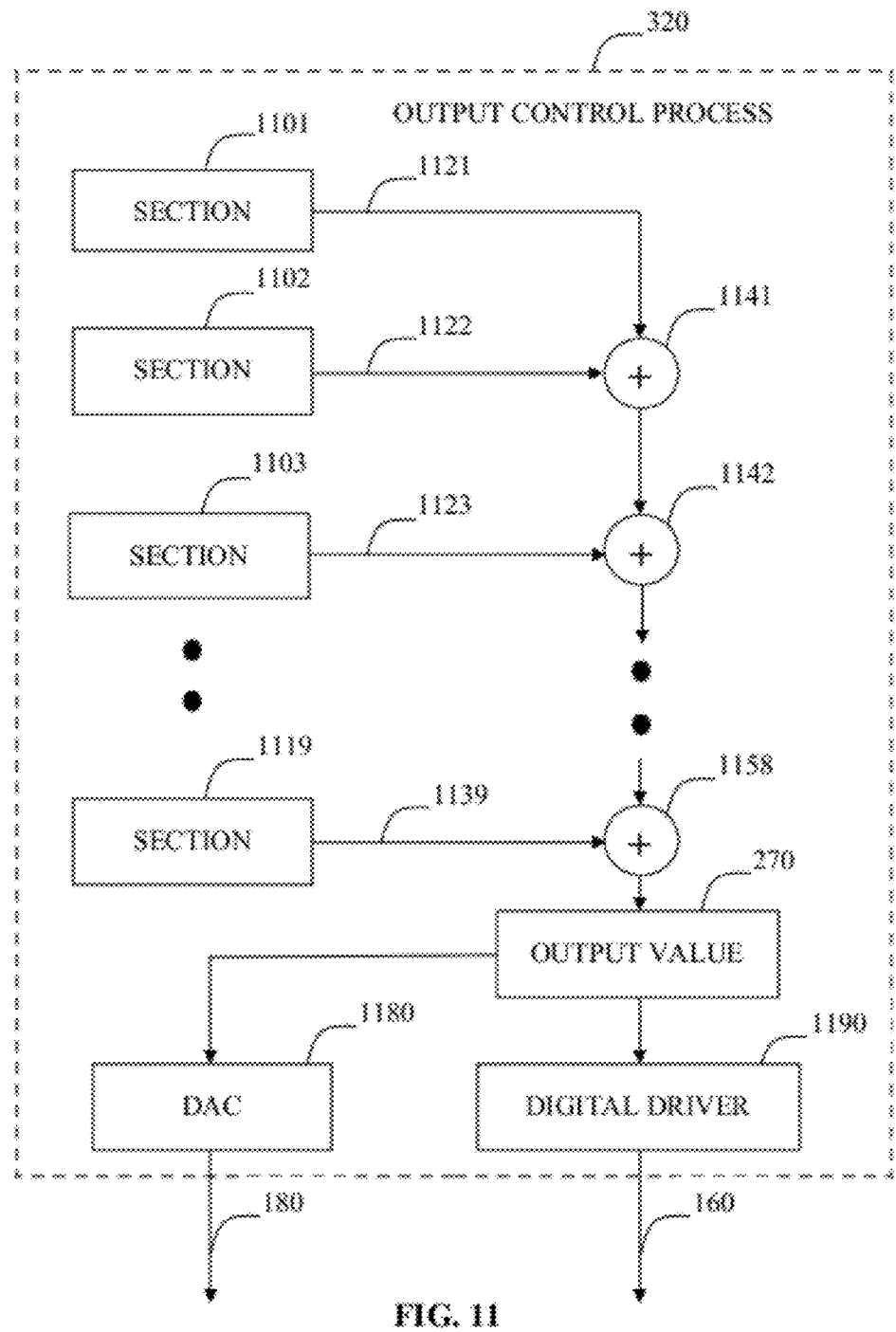
FIG. 11 is a block diagram that illustrates the output control process.

Consider FIG. 11. FIG. 11 shows the output control process 320 and its construction in this embodiment. Sections 1101, 1102, 1103 . . . 1119 are term evaluation circuits. There may be any predetermined number of sections in the output control process. Outputs of sections 1101, 1102, 1103 . . . 1119 are numbers. The section outputs are connected to hardware adders 1141, 1142 . . . 1158 via electrical connections 1121, 1122, 1123 . . . 1139. The output of the final adder 1158 is a number 270 that is the sum of the output of the sections 1101, 1102, 1103 . . . 1119. In this embodiment the hardware adders are sequentially disposed. Other advantageous dispositions are possible. The number 270 is read by a digital to analog converter DAC 1180 to produce an analog signal that is connected to the analog output 170 (FIG. 1) via electrical connection 180. The number 270 is read by a digital driver or buffer 1190 to produce a digital equivalent that is connected to the digital output 150 (FIG. 1) via electrical connections 160. In this embodiment the digital output signal is presented in parallel form on a predetermined number of output electrical connections to support a predetermined precision.

Figure 12:
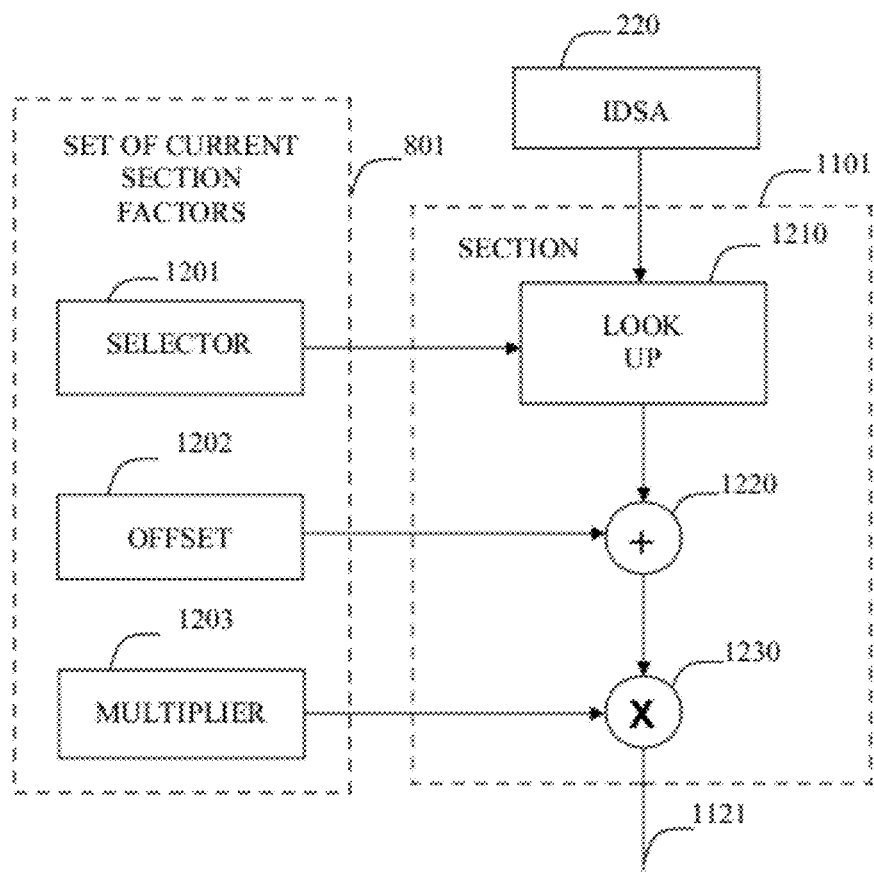
FIG. 12 is a block diagram that illustrates the content of a set of current section factors and the context in which they are used.

Consider FIG. 12. FIG. 12 illustrates the content of a set of current section factors and the context in which they are used. A set of current section factors 801 is shown as exemplary. This set of factors 801 is the first element of the current factor array (CFA) 260. The set of factors 801 contains or holds three numbers in memory in this embodiment. The first number is a selector 1201. The second number is an offset 1202. The third number is a multiplier 1203. These three numbers are connected to the first section 1101 of the output process 320. The input data status array (IDSA) 220 and the first number 1201 are connected to look up logic 1210. Look up logic 1210 and the second number 1202 are connected to a hardware adder 1220. Hardware adder 1220 and the third number 1203 are connected to a hardware multiplier 1230. The hardware multiplier is connected to the output control process 320 via electrical connection 1121. The second element of the array 260 is connected to the second section 1102, etc.

The combination and disposition of the memory and logic circuits enables the device to be constructed as a single integrated circuit which provides the possibility of producing a very high performance device that is low in power consumption and inexpensive to mass produce. The interface is relatively simple and error prone programming considerations are minimized. Use will be accessible to many programmers because it shares some features with the object oriented programming model, i.e. it is configured by setting properties and not by writing code.

DETAILED OPERATION OF A FIRST EMBODIMENT

Operation of the device involves analog and digital inputs as illustrated in FIG. 1. In this embodiment the analog inputs 130, 131, 132 . . . 139 are a like number of generators, light detecting sensors, potentiometers, and the like that vary the input voltage on input electrical connections 140, 141, 142 . . . 149 within the permitted electrical limits for such inputs. An analog to digital process 300 stores digital representations of the inputs in an input data status array (IDSA) 220.

In this embodiment a web browser 120 is a connected to electrical connections 122 using conventional hardware. The device control process 200 (FIG. 2) uses conventional methods and techniques to set data values in memory components of the device. Values set by the device control process 200 are elements of an indicator control array (ICA) 240, elements of a factor data array (FDA) 250, and a new state and flag 290.

In this embodiment the web browser may also use the device control process 200 to read data values from memory components of the device. Values read by the process 200 are elements of the indicator control array (ICA) 240, elements of the factor data array (FDA) 250, elements of the input data status array (IDSA) 220, elements of a current factor array (CFA) 260, a current factor indicator (CFI) 280, and an output value 270.

In this embodiment the memory components of the device consist of non volatile memory. Thus the device will maintain its pre-power-failure state during a power failure event.

Figure 13:
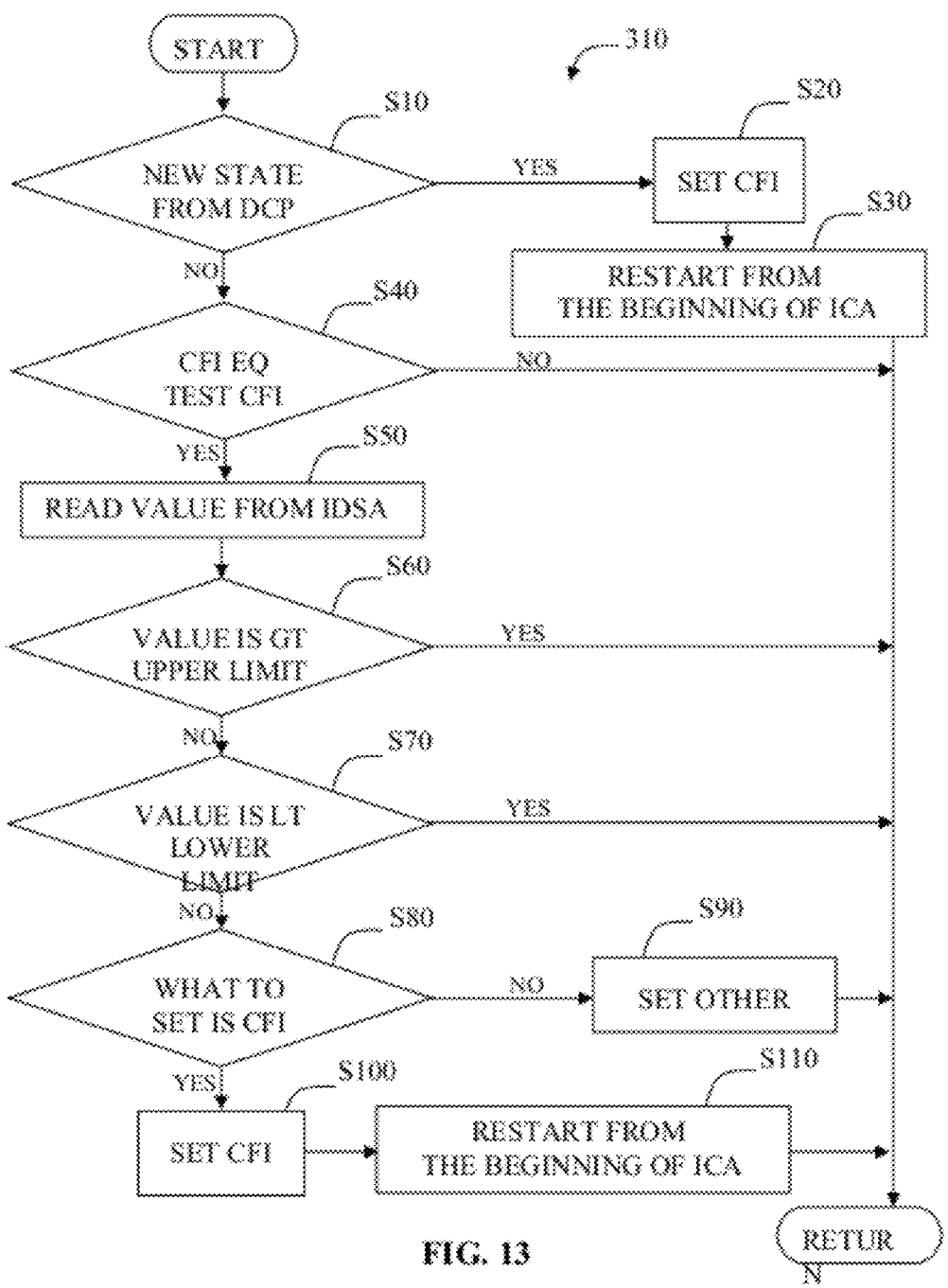
FIG. 13 is a flow chart that details the state control process

The indicator control array (ICA) 240 is loaded with data which serves to control the value in the current factor indicator (CFI) 280. This is done according to the state control process 310. Refer to FIG. 13. FIG. 13 is a detail of the state control process 310. The detail of the process 310 repeats continuously. The process 310 starts at the first set of state change factors 901 (FIG. 10). The first set of factors 901 is the first element of the array 240. The detail is repeated for each set of state change factors 901, 902, 903 . . . 999 in the array 240. When the process of FIG. 13 has been completed for the last set of state change factors 999 the process of FIG. 13 immediately resumes at the first set of state change factors 901. The last set of factors 999 is the last element of the array 240.

In this embodiment a reset results from a command from the communications client 120 (FIG. 1) that causes the value of the new state and flag 290 to be set. The new state is set to the desired value for the current factor indicator (CFI) 280 and the flag is set to true. Consequently the value of the current factor indicator (CFI) 280 is set to a known value. The conditional step S10 determines whether a command from the communications client 120 (FIG. 1) requests that the current factor indicator (CFI) 280 be set to a supplied value. The device control process 200 indicates this by setting new state and flag 290. The new state is set to the supplied value and flag is set to true. This step S10 tests the flag. If the flag is true flow continues with step S20 on the branch marked YES. If the flag is false flow continues with step S40 on the branch marked NO.

Still referring to FIG. 13 the step S20 causes the current factor indicator (CFI) 280 to be set to the new state and the flag to be reset to false. The indicator 280 points to and indicates a particular signal control factor array in the factor data array (FDA) 250. The signal control factor array 501 is exemplary of such. When the indicator 280 changes the indicated signal control factor array is copied to the current factor array (CFA) 260. The set and copy logic of this step S20 is part of both steps S20 and S100.

Still referring to FIG. 13 the step S30 causes the state control process 310 to resume processing at the first set of state change factors 901.

Still referring to FIG. 13 the step S40 compares the current factor indicator (CFI) 280 to the exemplary test CFI 1001 of the current set of state change factors 901 (FIG. 10). If the two values are equal the set of factors 901 is relevant to the current state. If the two values are not equal the factors 901 are not relevant to the current state and the remainder of the process of FIG. 13 is skipped.

Still referring to FIG. 13 the next step S50 reads a value from an identifiable memory location identified by the exemplary what to test 1002. The memory location may be in but is not required to be in the input data status array (IDSA) 220. For example, the memory location may contain zero or one. As a further example, the memory location may be a counter or timer. The value read from the memory location is for subsequent use.

Still referring to FIG. 13 the next step S60 compares the value read in step S50 to the exemplary upper limit 1003. If the value read in step S50 is greater than the exemplary upper limit 1003 the current set of state change factors 901 is not relevant to the current state and the remainder of the process of FIG. 13 is skipped. If the value read in step S50 is not greater than the exemplary upper limit 1003 the process of FIG. 13 continues.

Still referring to FIG. 13 the next step S70 compares the value read in step S50 to the exemplary lower limit 1004. If the value read in step S50 is less than the exemplary lower limit 1004 the current set of state change factors 901 is not relevant to the current state and the remainder of the process of FIG. 13 is skipped. If the value read in step S50 is not less than the exemplary lower limit 1004 the process of FIG. 13 continues.

Still referring to FIG. 13 the next step S80 begins to determine the appropriate action to take. This step S80 compares the exemplary what to set 1005 to a predetermined value that indicates the current factor indicator (CFI) 280 is the object of the action. If the indicator 280 is the object of the action the logical flow is to step S100. If the indicator 280 is not the object of the action the logical flow is to step S90.

Still referring to FIG. 13 the conditional step S90 sets some object other than the current factor indicator (CFI) 280. For example a counter or timer could be stopped, started, reset, incremented, or resumed.

Still referring to FIG. 13 the step S100 causes the current factor indicator (CFI) 280 to be set to the exemplary value to which it should be set 1006. The indicator 280 points to and indicates a particular signal control factor array in the factor data array (FDA) 250. The signal control factor array 501 is exemplary of such. When the indicator 280 changes, the indicated signal control factor array is copied to the current factor array (CFA) 260. The set and copy logic of this step S100 is part of both steps S20 and S100.

Still referring to FIG. 13 the step S110 causes the state control process 310 to resume processing at the first set of state change factors 901.

Thus, the steps and arrangement of the state control process 310 constitute a means for using the indicator control array 240 for calculating and setting the current factor indicator (CFI) 280 and a means for copying a signal control factor array from the factor data array (FDA) 250 to the current factor array (CFA) 260. The copying is according to the current factor indicator (CFI) 280 or its equivalent.

It can thus be seen that the current factor array (CFA) 260 is a selection from the factor data array (FDA) 250. The factor data array (FDA) 250 is a set of parameters supplied by the user. The array 250 is organized according to the modes defined by the user. The user supplies a set of parameters for each mode. Each mode is tied to a separate value of the current factor indicator (CFI) 280. The appropriate set of parameters supplied by the user is moved to current factor array (CFA) 260 as the indicator 280 changes.

Inspection of the features just recited reveals the flexibility and potential of the described arrangement of memory and logic circuits.

The output control process 320 is arranged to calculate the value of a polynomial mathematical expression. In this embodiment the polynomial is the sum of a series of terms where each term is the product of two numbers. Of the two numbers, one is the sum of two signed numbers. In this embodiment there are twelve (12) such terms. At this time (July, 2010) I contemplate that this may be a near optimal number of terms but the number could be as few as two or three.

FIG. 11 illustrates the addition logic that adds the terms of the polynomial expression in this embodiment. The output of the sections 1101, 1102, 1103 . . . 1119 are numbers in digital form that are expressed on electrical connections 1121, 1122, 1123 . . . 1139. The number of sections is the same as the predetermined number of terms of the polynomial expression. The numbers are summed by the hardware adders 1141, 1142 . . . 1158. The sum is held in output value 270. The number 270 is read by a digital to analog converter DAC 1180 to produce an analog signal on electrical connections 180. The number 270 is read by a digital driver or buffer 1190 to produce a digital signal on electrical connections 160.

FIG. 12 illustrates the disposition of a section of hardware addition and multiplication logic that computes the values of the individual terms of the expression in this embodiment. The current factor array (CFA) 260 holds sets of current section factors. A set of current section factors 801 is shown as exemplary. The set of factors 801 is the first element of the array 260. The number of current section factors in the array 260 is the same as the number of sections in the output control process 320. Look up circuit 1210 uses exemplary selector 1201 of factors 801 as an index to select an input that is potentially but not necessarily from the input data status array (IDSA) 220. The input is shifted according to the exemplary offset 1202 using hardware adder 1220. The output of hardware adder 1220 is scaled by multiplying it with the exemplary multiplier 1203 using hardware multiplier 1230. The output of the multiplier 1230 feeds the hardware adder logic 1141 of FIG. 11 via electrical connections 1121 in this example.

Thus, the arrangement of the circuits of the output control process 320 constitute a means for using the current factor array (CFA) 260 to access and read selected values from the input data status array (IDSA) 220 and a means for shifting and scaling values from array 220 and a means for summing the results of the shifting and scaling and setting the output value 270.

DESCRIPTION OF A SECOND EMBODIMENT

Consider FIG. 1. In a second embodiment, the device 100 is a microcontroller. In this embodiment there is a digital output 150 connected to the device 100 via electrical connections 160. In this embodiment analog output 170 and electrical connections 180 are omitted.

Consider FIG. 2. In this embodiment the communications client 120 (FIG. 1) is a serial communications terminal, such as HYPERTERM, that communicates with the microcontroller via RS232. The receiver/transmitter 210 includes conventional software for such communications.

Consider FIG. 3. In this second embodiment, the device 100 is a general purpose microcontroller. In this embodiment the processes of this fig are implemented in software.

Consider FIG. 12. In this embodiment the digital output signal is a pulse-width modulated (PWM) digital output signal at a predetermined refresh rate.

It may be observed that the performance characteristics of the second embodiment will differ from those of the first embodiment. It may be observed that this embodiment could potentially be paired with a common servo to produce a nonlinear adaptive motor control system.

In this embodiment a serial communications terminal is used to set the data values in memory components of the device. It may be observed that settings are not limited to the PID settings of a conventional servo. It may be observed that control may switch from closed loop to open loop and back as needed.

DESCRIPTION OF A THIRD EMBODIMENT

Consider FIG. 1. In a third embodiment, the device 100 is a field-programmable gate array (FPGA). In this embodiment there is an analog output 170 connected to the device 100 via electrical connections 180. In this embodiment digital output 150 and electrical connections 160 are omitted.

Consider FIG. 2. In this embodiment the communications client 120 (FIG. 1) is a custom program with a graphic user interface that communicates with the FPGA using the universal serial bus (USB). The receiver/transmitter 210 includes conventional circuitry for such communications.

It may be observed that the performance characteristics of the third embodiment will differ from those of the first two embodiments. It may further be observed that this embodiment could potentially be paired with a linear amplifier to produce a well controlled light control system.

Conclusion, Ramifications and Scope

Accordingly, the reader will see that, according to one embodiment of the invention I have provided an electronic integrated-circuit device in which mode control commands are stored. Parameters for each mode are also stored in the device. One or more analog signals are input and are used as determined by the stored parameters according to the stored commands and current mode. One or more output signals are produced While the present arrangement has been described according to some of its presently preferred embodiments, it is of course contemplated that modifications of, and alternatives to, these embodiments, such modifications and alternatives obtaining the advantages and benefits of this arrangement, will be apparent to those of ordinary skill in the art having reference to this specification and its drawings. It is contemplated that such modifications and alternatives are within the scope of this arrangement as subsequently claimed herein. For example, the communications protocol could vary and the number of fields and elements in the various arrays could vary.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

Thus the scope of the invention should be determined by the appended claims and their legal equivalents, and not by the examples given.

What is claimed is:

1. An electronic device for generating an electronic signal comprising:

a. a plurality of input circuits for forming digital representations of a plurality of electrical inputs;

b. a first memory for holding said digital representations of said inputs said first memory comprising an index addressable input data status array;

c. a second memory for holding sets of state change factors said state change factors comprising sets of values such as test current factor indicator, what to test identifier, upper limit, lower limit, what to set identifier, value to which it should be set, and the like said second memory comprising an index addressable indicator control array;

d. a third memory for holding signal control factor arrays said signal control factor arrays comprising sets of section control factors said section control factors comprising sets of values such as input identifier, input value offset, input term multiplier, and the like said third memory comprising an index addressable factor data array;
e. a fourth memory for holding sets of current section factors said current section factors comprising values such as selector, offset, multiplier, and the like said fourth memory comprising a current factor array;
f. a fifth memory for holding a number, said number being an output value;
g. a sixth memory for holding a first index value, said first index comprising a current factor indicator;
h. a seventh memory for holding a second index value, said second index comprising a new state;
i. an eight memory for holding a boolean value, said boolean comprising a flag;
j. a first logic means for using said indicator control array for calculating and setting said current factor indicator said first logic means comprising a state control process;
k. a second logic means for copying a signal control factor array from said factor data array to said current factor array said copying being according to said current factor indicator said second logic means comprising an additional component of said state control process;
l. a third logic means for using the selector in said current factor array to access and read selected values from said input data status array said third logic means comprising an output control process said third logic means being duplicated and redundant according to the number of sections of said output control process;
m. a fourth logic means for using additional values in said current factor array as addends and multiplicands to shift and scale said selected values from said input data status array said fourth logic means comprising an additional component of said output control process said fourth logic means being duplicated and redundant according to the number of sections of said output control process;
n. a fifth logic means for summing the results of said shifted and scaled values according to the number of sections of said output control process and for setting said output value to said sum said fifth logic means comprising an additional component of said output control process;
o. a circuit for forming one or more electrical output signals from said output value whereby said output signal may be used variously, for example, to control a motor, a light source or to transmit information to a display device.

2. The electronic device of claim 1 further including a sixth logic means for communicating with said device for reading and setting values in the various memories thereof.

3. The electronic device of claim 2 wherein said sixth logic means operates according to a conventional scheme selected from the group comprised of a parallel bus, a serial bus, the internet, the internet protocol, ethernet, universal serial bus, serial teletype communications protocol, serial peripheral interface, inter-integrated circuit bus, a publically documented protocol, a proprietary communication protocol and a similar such scheme.

4. The electronic device of claim 1 wherein said digital representations of said inputs bear a linear relationship to the corresponding electrical input.

5. The electronic device of claim 1 wherein said digital representations of said inputs may permissibly bear a non-linear relationship to the corresponding electrical input.

6. The electronic device of claim 1 wherein all electrical inputs are analog.

7. The electronic device of claim 1 wherein all electrical inputs are digital.

8. The electronic device of claim 1 wherein said electrical inputs are a mixture of analog and digital.

9. The electronic device of claim 1 wherein the input identifier identifies a specific input selected from the group comprised of a value stored in the input data status array, an internal register of the electronic device, a memory of the device, a timer that is part of the device, a timer that is external to the device, a clock that is part of the device, a clock that is external to the device and a similar value.

10. The electronic device of claim 1 wherein any value stored in the factor data array is selected from the group comprised of a coefficient that affects the output proportional to an input, a coefficient that affects the output relative to the integral of an input, a coefficient that affects the output relative to the derivative of an input, a coefficient that affects the output relative to another mathematical function of an input and a similar value.

11. The electronic device of claim 1 wherein the device is selected from the group comprised of a microprocessor, a microcontroller, a gate array, a field programmable gate array, an application specific integrated circuit, a computer, a calculator, an optoelectronic computer and an equivalent such device.

12. The electronic device of claim 1 wherein said output signal is analog.

13. The electronic device of claim 1 wherein said output signal is digital.

14. The electronic device of claim 1 further including additional sets of arrays and means said additional sets of arrays and means being disposed such that plural independent output signals may be generated and the inputs may be shared.

15. The electronic device of claim 14 further including a sixth logic means for communicating with said device for reading and setting values in the various memories thereof.

16. The electronic device of claim 15 wherein said sixth logic means operates according to a conventional scheme selected from the group comprised of a parallel bus, a serial bus, the internet, the internet protocol, ethernet, universal serial bus, serial teletype communications protocol, serial peripheral interface, inter-integrated circuit bus, a publically documented protocol, a proprietary communication protocol and a similar such scheme.

17. In an electronic device having:
a. a plurality of input circuits for forming digital representations of a plurality of electrical inputs;
b. a first memory for holding said digital representations of said inputs said first memory comprising an index addressable input data status array;
c. a second memory for holding sets of state change factors said state change factors comprising sets of values such as test current factor indicator, what to test identifier, upper limit, lower limit, what to set identifier, value to which it should be set, and the like said second memory comprising an index addressable indicator control array;
d. a third memory for holding signal control factor arrays said signal control factor arrays comprising sets of section control factors said section control factors comprising sets of values such as input identifier, input value offset, input term multiplier, and the like said third memory comprising an index addressable factor data array;
e. a fourth memory for holding sets of current section factors said current section factors comprising values such as selector, offset, multiplier, and the like said fourth memory comprising a current factor array;

f. a fifth memory for holding a number, said number being an output value;

g. a sixth memory for holding a first index value, said first index comprising a current factor indicator;

h. a seventh memory for holding a second index value, said second index comprising a new state;

i. an eight memory for holding a Boolean value, said boolean comprising a flag; and j. a circuit for forming one or more electrical output signals from said output value whereby said output signal may be used variously, for example, to control a light source, a motor, or to transmit information to a display device;

a method for setting said output value comprising:

a. using said indicator control array to calculate and set said current factor indicator according to a state control process;

b. copying a signal control factor array from said factor data array to said current factor array said copying being according to said current factor indicator according to said state control process;

c. using the selector in said current factor array to access and read selected values from said input data status array said use being duplicated and redundant according to the predetermined number of sections of an output control process;

d. using the offset and multiplier values in said current factor array as addends and multiplicands to shift and scale said selected values from said input data status array said use being duplicated and redundant according to the number of sections of said output control process;

e. summing the results of said shifted and scaled values according to the number of sections of said output control process and setting said output value to said sum.

* * * * *